(12) United States Patent
Kwon et al.

(10) Patent No.: US 12,405,572 B2
(45) Date of Patent: Sep. 2, 2025

(54) ELECTRONIC DEVICE AND METHOD FOR PROCESSING COMPUTER-GENERATED HOLOGRAPHY

(71) Applicant: SAMSUNG ELECTRONICS CO., LTD., Suwon-si (KR)

(72) Inventors: Namseop Kwon, Suwon-si (KR); Jangwoo You, Seoul (KR); Myungjae Jeon, Yongin-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 513 days.

(21) Appl. No.: 17/854,925

(22) Filed: Jun. 30, 2022

(65) Prior Publication Data
US 2023/0161292 A1 May 25, 2023

(30) Foreign Application Priority Data
Nov. 23, 2021 (KR) .......... 10-2021-0162794

(51) Int. Cl.
G06T 19/00 (2011.01)
G02B 27/00 (2006.01)
G03H 1/00 (2006.01)
G03H 1/02 (2006.01)
(Continued)

(52) U.S. Cl.
CPC .......... *G03H 1/26* (2013.01); *G02B 27/0093* (2013.01); *G03H 1/0005* (2013.01); *G03H 1/02* (2013.01); *G06F 3/1438* (2013.01); *G03H 2001/0088* (2013.01)

(58) Field of Classification Search
CPC ............ G06T 19/006; G06T 19/00; G06T 2207/10028; G06T 3/00; G06T 7/70; G09G 2320/0285; G09G 2300/04; G09G 3/003; G06F 3/012; G06F 3/013; G06F 3/1438;
(Continued)

(56) References Cited

U.S. PATENT DOCUMENTS

| | | |
|---|---|---|
| 9,747,726 B2 | 8/2017 | Williams et al. |
| 2011/0096145 A1 | 4/2011 | Schwerdtner |
| 2015/0029218 A1 | 1/2015 | Williams et al. |

(Continued)

FOREIGN PATENT DOCUMENTS

| | | |
|---|---|---|
| KR | 1020120045269 A | 5/2012 |
| KR | 10 2016 0006033 A | 1/2016 |

(Continued)

OTHER PUBLICATIONS

Van Waveren, J.M.P., "The Asynchronous Time Warp for Virtual Reality on Consumer Hardware", Creative Commons Attribution International, VRST'16, Nov. 2-4, 2016, pp. 37-46.
(Continued)

*Primary Examiner* — Hau H Nguyen
(74) *Attorney, Agent, or Firm* — Sughrue Mion, PLLC

(57) ABSTRACT

Provided are an electronic device for processing computer-generated holography (CGH) and a method thereof. The electronic device generates a plurality of depth layers (computer-generated holography) having different depth information from image data at a first view point, and reprojects each of the plurality of depth layers based on the user's pose information at the second view point different from the first view point to generates CGH.

18 Claims, 12 Drawing Sheets

GENERATE CGH INCLUDING PLURALITY OF DEPTH LAYERS WITH DIFFERENT DEPTH INFORMATION AT FIRST VIEW POINT — S210

REPROJECT EACH OF PLURALITY OF DEPTH LAYERS BASED ON POSE INFORMATION OF USER AT SECOND VIEW POINT — S220

(51) Int. Cl.
*G03H 1/26* (2006.01)
*G06F 3/14* (2006.01)

(58) Field of Classification Search
CPC .............. G03H 1/26; G03H 2210/454; G03H 2001/2242; G03H 1/2294
See application file for complete search history.

(56) References Cited

U.S. PATENT DOCUMENTS

| | | | |
|---|---|---|---|
| 2016/0011565 A1 | 1/2016 | Sung et al. | |
| 2017/0038728 A1* | 2/2017 | Zschau | ................ G03H 1/2249 |
| 2017/0374341 A1 | 12/2017 | Michail et al. | |
| 2018/0276824 A1 | 9/2018 | Haraden et al. | |
| 2021/0392312 A1* | 12/2021 | Bleyer | ................ H04N 13/111 |
| 2022/0375196 A1 | 11/2022 | Kwon et al. | |

FOREIGN PATENT DOCUMENTS

| | | |
|---|---|---|
| KR | 1020160039958 A | 4/2016 |
| KR | 10 2019 0133716 A | 12/2019 |
| KR | 102234819 B1 | 4/2021 |

OTHER PUBLICATIONS

Aga, H., et al., "Latency Compensation for Optical See-Through Head-Mounted with Scanned Display", SID 2019 Digest, pp. 330-333.

Communication dated Jun. 28, 2025 issued by the Korean Intellectual Property Office in Korean Patent Application No. 10-2021-0162794.

* cited by examiner

ELECTRONIC DEVICE AND METHOD FOR PROCESSING COMPUTER-GENERATED HOLOGRAPHY

CROSS-REFERENCE TO RELATED APPLICATION

This application is based on and claims priority under 35 U.S.C. § 119 to Korean Patent Application No. 10-2021-0162794, filed on Nov. 23, 2021, in the Korean Intellectual Property Office, the disclosure of which is incorporated by reference herein in its entirety.

BACKGROUND

1. Field

Example embodiments of the present disclosure relate to an electronic device for processing computer-generated holography (CGH) and an operating method thereof.

2. Description of Related Art

Augmented reality (AR) refers to a technology for synthesizing virtual objects or information in an actual environment to make them appear as if they exist in an original environment. AR technology may provide an intuitive user experience such as voice recognition, gaze recognition, and hand gesture recognition, and may provide various services in various fields such as education, industry, medical care, or entertainment.

AR may be implemented through a head mounted display (HMD) device. The HMD device refers to a display device that is mounted on a user's head and may present an image directly in front of his/her eyes. When the HMD device is mounted directly on the user's head and the user's movement is detected in real time, the HMD device may implement AR by displaying an image reflecting the user's movement on the display.

Based on a way that augmented reality is implemented, when the user's movement and the image displayed on the display do not match, the user's immersion may be disturbed. The parallax between the user's movement and the image displayed on the display may correspond to motion to photon latency, and an image correction method is needed to minimize this motion to photon latency.

The augmented reality device may correct the image by reflecting the user's final pose before displaying the rendered image on the display, and this correction technique may correspond to time-warping. In the related time warping, a reprojection operation of correcting spatial coordinates for a rendered image is performed.

On the other hand, a holographic image using computer-generated holography (CGH) has an interference pattern called a fringe, and the fringes generated at each depth are mixed with each other. It is difficult to apply related reprojection method of correcting spatial coordinates for an image to a holographic image.

SUMMARY

One or more example embodiments provide an electronic device for processing computer-generated holography (CGH) and an operating method thereof.

Additional aspects will be set forth in part in the description which follows and, in part, will be apparent from the description, or may be learned by practice of the example embodiments of the disclosure.

According to an aspect of an example embodiment, there is provided an electronic device for processing computer-generated holography (CGH), the electronic device including a first processor configured to generate a plurality of depth layers having different depth information from image data at a first view point, and a second processor configured to generate CGH by reprojecting each of the plurality of depth layers based on pose information of a user at a second view point different from the first view point.

The electronic device may further include a spatial light modulator configured to generate a holographic image based on the CGH.

The second processor may be further configured to reproject each of the plurality of depth layers by pixel-shifting pixels included in each of the plurality of depth layers based on the pose information and depth information of each of the plurality of depth layers.

In the second processor, a pixel shift of a depth layer with first depth information may be less than a pixel shift of a depth layer with second depth information, the first depth information being greater than the second depth information.

The second processor may be further configured to simultaneously reproject each of the plurality of depth layers.

The second processor may be further configured to perform reprojection in an order from a depth layer having first depth information to a depth layer having second depth information among the plurality of depth layers, the first depth information being greater than the second depth information.

The electronic device may further include an output buffer configured to store the plurality of reprojected depth layers, wherein the second processor may be further configured to overwrite the reprojected second depth layer having second depth information to the reprojected first depth layer having first depth information, the first depth information being greater than the second depth information.

The second processor may be further configured to store a pixel value of a first pixel among pixels included in the reprojected first depth layer, overlapping a second pixel included in the reprojected second depth layer as a pixel value of the reprojected second depth layer.

The pose information may include a pose change amount from the first view point to the second view point.

The first processor may be further configured to generate a plurality of depth layers having different depth information from new image data while the second processor reprojects each of the plurality of depth layers to the second view point.

The electronic device may further include a first input buffer and a second input buffer configured to store depth layers, wherein, while the second processor performs reprojection based on the depth layers stored in the first input buffer, the first processor may be further configured to store a plurality of depth layers having different depth information generated from new image data in the second input buffer.

The electronic device may be included in at least one of a head mounted display (HMD), a glasses-type display, and a goggle-type display.

According to an aspect of an example embodiment, there is provided a method of operating an electronic device for processing computer-generated holography (CGH), the method including generating a plurality of depth layers having different depth information from the image data at a first view point, and reprojecting each of the plurality of depth layers based on pose information of a user at a second view point different from the first view point to generate CGH.

The method may further include generating a holographic image based on the CGH.

The reprojecting of the each of the plurality of depth layers may include pixel-shifting pixels included in each of the plurality of depth layers based on the pose information and depth information of each of the plurality of depth layers.

In the pixel-shifting of the pixels, a pixel shift of a depth layer with first depth information may be less than a pixel shift of a depth layer with second depth information, the first depth information being greater than the second depth information.

The reprojecting of the each of the plurality of depth layers may include performing reprojection in an order from a depth layer having first depth information to a depth layer having second depth information among the plurality of depth layers, the first depth information being greater than the second depth information.

The method may further including storing the plurality of reprojected depth layers, wherein the storing of the plurality of reprojected depth layers may include overwriting the reprojected second depth layer having second depth information to the reprojected first depth layer having first depth information, the first depth information being greater than the second depth information.

The overwriting of the reprojected second depth layer may include storing a pixel value of a first pixel, among pixels included in the reprojected first depth layer, overlapping a secondpixel included in the reprojected second depth layer as a pixel value of the reprojected second depth layer.

The pose information may include a pose change amount from the first view point to the second view point.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
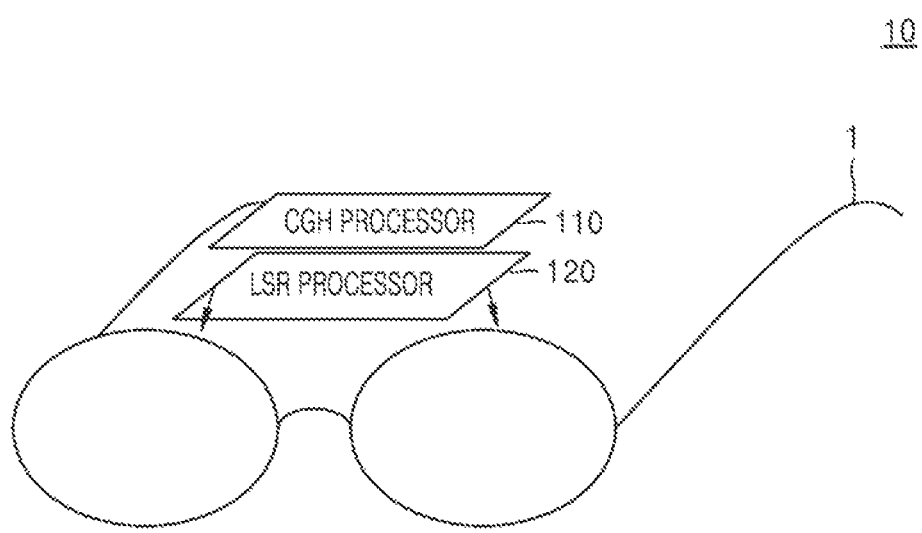
FIG. 1 is a diagram illustrating a connection method of an electronic device according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, an electronic device for processing a holographic image and a method thereof will be described in detail with reference to the accompanying drawings. In the following drawings, the same reference numerals refer to the same components, and the size of each component in the drawings may be exaggerated for clarity and convenience of description. Further, the example embodiments described below are merely exemplary, and various modifications are possible from these embodiments.

The terms used in the example embodiments were selected as currently widely used general terms as possible, and this may vary depending on the intention or precedent of a person skilled in the art, the emergence of new technology, and the like. In addition, in certain cases, there are terms arbitrarily selected by the applicant, and in this case, the meaning of the terms will be described in detail in the description of the corresponding invention. Therefore, the terms used in the specification should be defined based on the meaning of the term and the overall content of the specification, rather than the simple name of the term.

Terms such as "consisting" or "comprising" used in the present embodiments should not be construed as necessarily including all of the various elements or various steps described in the specification, and some of the elements or some steps may not be included, or it should be interpreted that additional elements or steps may be further included.

In the example embodiments, when a component is said to be "connected" with another component, this should be interpreted as being able to include not only a case in which they are directly connected, but also a case in which they are electrically connected with another element arranged therebetween.

In addition, terms including an ordinal number such as "first" or "second" used in the present embodiments may be used to describe various components, but the components should not be limited by the terms. The terms are used only for the purpose of distinguishing one component from another.

Hereinafter, an example embodiment will be described in detail with reference to the accompanying drawings. However, the example embodiment may be implemented in several different forms and is not limited to the examples described herein.

An electronic device for processing a holographic image according to an example embodiment may be implemented as various types of wearable devices, such as a head mounted display (HMD), a glasses-type display, or a goggle-type display.

FIG. 1 is an exemplary diagram illustrating a connection method of an electronic device 10 according to an example embodiment.

Referring to FIG. 1, the electronic device 10 may be configured to be integrally coupled with an augmented reality (AR) glass 1. For example, the electronic device 10 may be attached to at least a partial region of the AR glass 1 in the form of an electronic circuit or may be incorporated and coupled to at least a partial region. The electronic device 10 is physically and/or electrically connected to the processor 13 of the AR glass 1 at a location close to the electronic device 10, so that the electronic device 10 may quickly process a graphic-related operation. Calculations related to graphics include per-pixel processing on an image taken through the AR glass 1, graphic processing related to user movement of the AR glass 1 and/or the electronic device 10, or an image processing according to direction and movement.

For example, the electronic device 10 may be designed in a field programmable gate array (FPGA) and included in the AR glass 1. The electronic device 10 may be integrally coupled with the AR glass 1 or may be communicatively connected through a communication interface. The electronic device 10 may include a computer-generated holography (CGH) processor 110 and a late stage reprojection (LSR) processor 120. The CGH processor 110 and the LSR processor 120 will be described later.

The above-described electronic device 10 is not limited thereto, and may be another device that interworks with a wearable device, a head mounted display (HMD), or the like. For example, the processor 13 may be provided in a smart phone.

Figure 2:
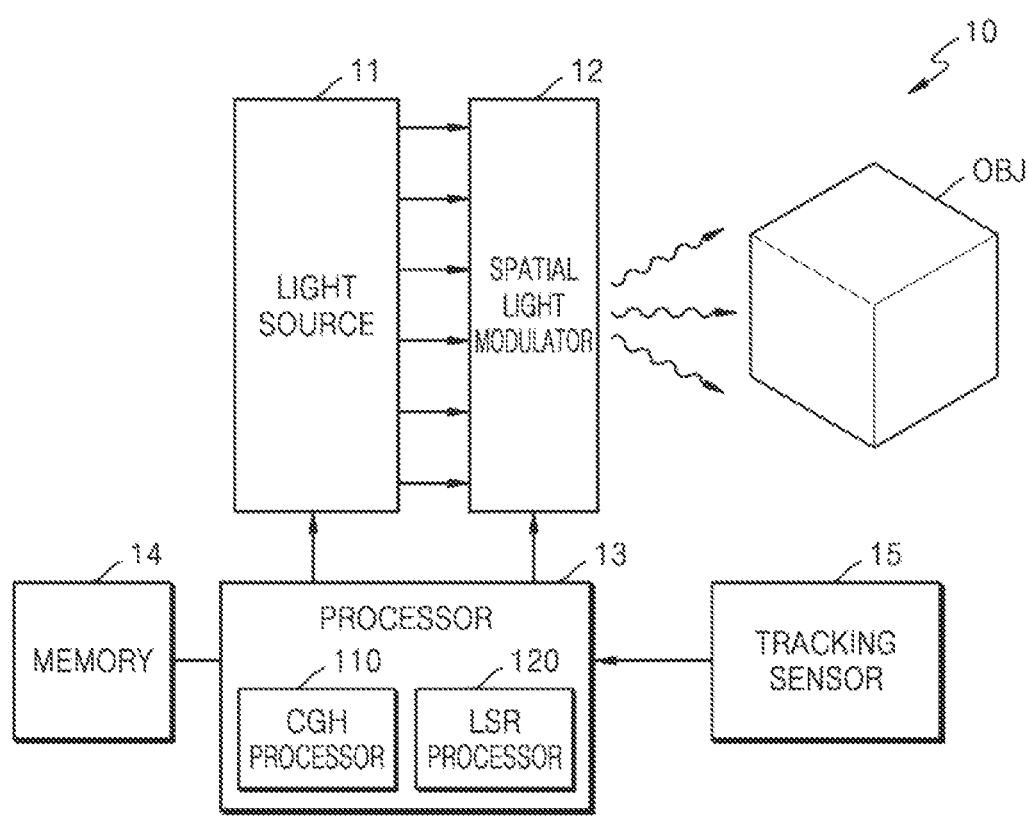
FIG. 2 is a conceptual diagram showing a schematic structure of an electronic device for processing a holographic image according to an example embodiment.

FIG. 2 is a conceptual diagram showing a schematic structure of an electronic device 10 for processing a holographic image according to an example embodiment.

The electronic device 10 may include a light source unit 11, a spatial light modulator 12 configured to modulate light from the light source unit 11, and a processor 13 configured to generate CGH based on input image data and controlling the spatial light modulator 12 to generate a holographic image by modulating light according to the CGH. The electronic device 10 may further include a memory 14 and a tracking sensor 15.

The light source unit 11 may provide a coherent light beam to the spatial light modulator 12. The light source unit 11 may be a light source providing coherent light, and may include, for example, a light emitting diode (LED), a laser diode (LD), an organic light emitting diode (OLED), a vertical cavity surface emitting laser (VCSEL), and the like, and may include various light sources capable of providing the spatial light modulator 12 with light having a certain level or more of spatial coherence. The light source unit 11 may also include a collimating lens for collimating the light emitted from the light source, or a beam expander for expanding the light in the form of a surface light.

The spatial light modulator 12 may include a spatial light modulator that modulates the intensity or phase of incident light. For example, the spatial light modulator 12 may include a liquid crystal on silicon (LCoS) device or a liquid crystal display (LCD) device, and various compound semiconductor-based semiconductor modulators, digital micromirror devices (DMDs), and the like may be used as the spatial light modulator 12. In FIG. 2, the spatial light modulator 12 is shown as a transmissive type, but this is exemplary and the spatial light modulator 12 may be implemented as a reflective type.

The processor 13 may perform general functions for controlling the electronic device 10. The processor 13 may correspond to a processor included in various types of computing devices, such as a personal computer (PC), a server device, a television (TV), a mobile device (e.g., a smartphone, a tablet device, etc.), an embedded device, an autonomous vehicle, a wearable device, an AR device, and an Internet of Things (IoT) device. For example, the processor 13 may correspond to the processor 13 such as a central processing unit (CPU), a graphics processing unit (GPU), an application processor (AP), or a neural processing unit (NPU), but is not limited thereto.

In an example embodiment, the processor 13 may generate a CGH based on image data, and reproject the CGH based on the user's pose information to generate a reprojected CGH. The processor 13 may include a CGH processor 110 (a 'first processor') that generates a CGH including a plurality of depth layers having different depth information based on the image data and an LSR processor 120 (a 'second processor') that determines the user's pose information based on the result received from the tracking sensor 15 and generates a reprojected CGH by reprojecting the plurality of depth layers according to the pose information. For convenience of explanation below, CGH including a plurality of depth layers having different depth information generated by the CGH processor 110 may correspond to a plurality of different depth layers, and the reprojected CGH of the LSR processor 120 may be also simply referred to as CGH.

Figure 3:
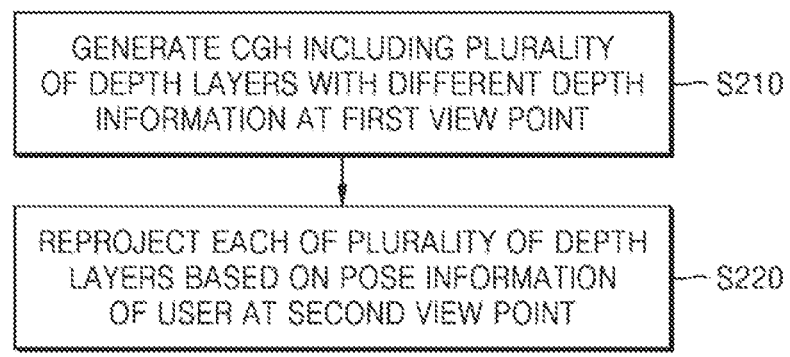
FIG. 3 is a flowchart illustrating a method of compensating for latency for computer-generated holography (CGH) according to an example embodiment.

FIG. 3 is a flowchart illustrating a method of compensating for a latency for CGH according to an example embodiment.

In an example embodiment, the CGH processor 110 may generate a plurality of depth layers having different depth information from the image data at the first view point (S210).

In an example embodiment, the LSR processor 120 may generate a CGH by reprojecting each of the plurality of depth layers based on the user's pose information at a second view point different from the first view point (S220).

The CGH processor 110 may generate a CGH in a depth map method. The depth map method generates a CGH after modeling an object by approximating the object to multi depth, and may have higher computational efficiency than other methods. In addition, it is possible to generate a CGH only with two-dimensional (2D) intensity information and depth information such as a general photo.

In an example embodiment, the CGH processor 110 may perform the CGH operation with a layer-based algorithm using image data, for example, image data rendered in the memory 14 or an external device, to generate CGH image data.

The CGH processor 110 may perform an operation by dividing the reproduction area of the holographic image based on the depth. The CGH processor 110, for example, may perform Fourier Transform, Fast Fourier Transform (FFT), Inverse Fourier Transform (IFT), or Inverse Fast Fourier Transform (IFFT) for the image data of each layer divided based on the depth. For example, the CGH processor 110 may generate a CGH including a plurality of depth layers having different depth information by repeatedly performing the Fourier transform and the IFFT two or more times.

Figure 4A:
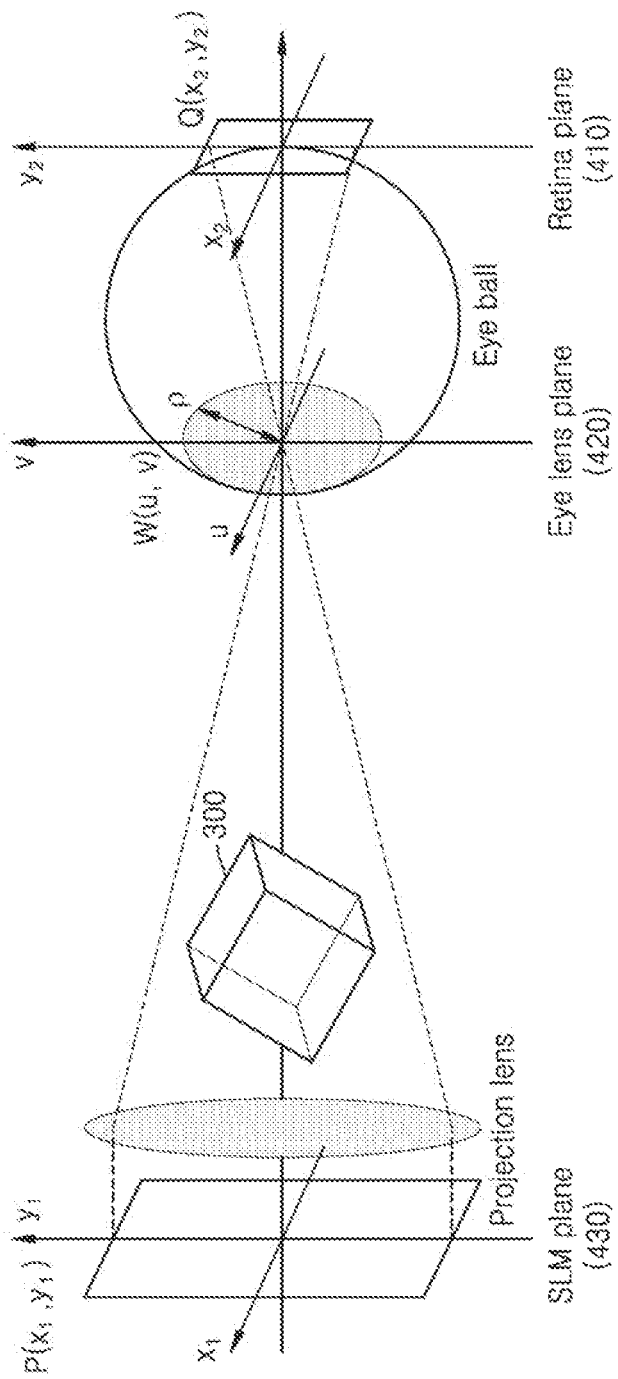
FIGS. 4A and 4B are diagrams for explaining 2D images for each depth layer of an object when a CGH of an object is generated using a depth map method according to an example embodiment.
Figure 4B:
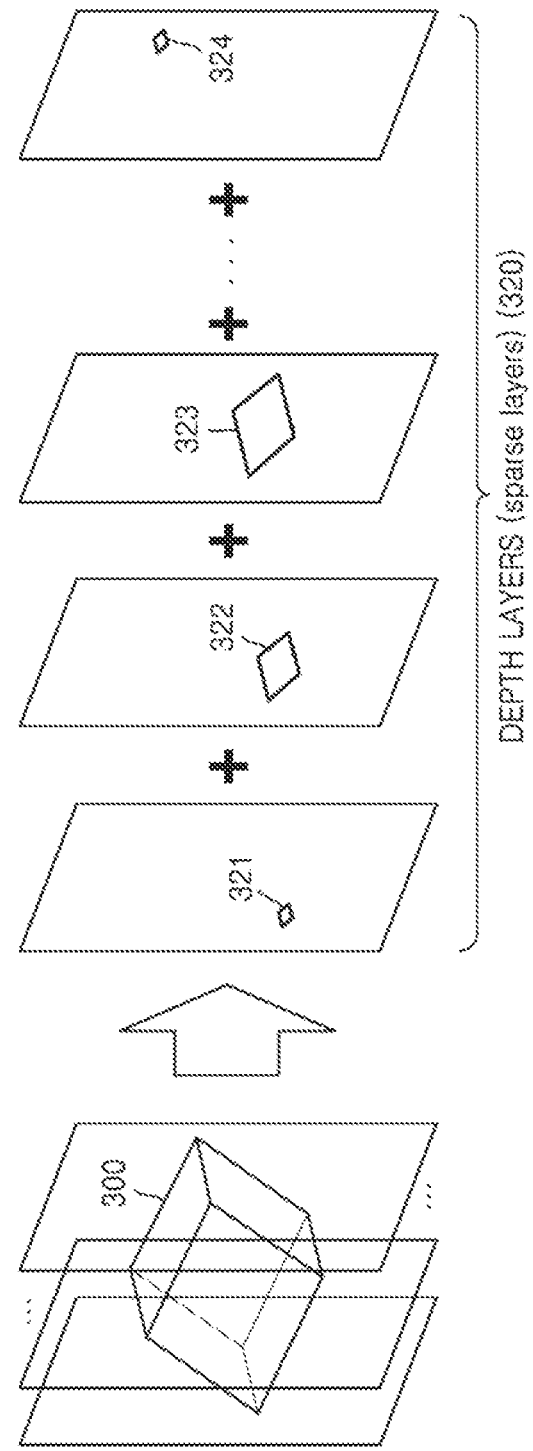

FIGS. 4A and 4B are diagrams for explaining 2D images for each depth layer of an object when a CGH of an object is generated using a depth map method according to an example embodiment.

Referring to FIG. 4A, the object 300 is positioned in a space between the lens plane 420 W(u,v) and the SLM plane 430 (or CGH plane) P(x1, y1). According to the depth map method, this space may be set to be divided into a preset number of depth layers. Here, the number of depth layers is an arbitrary number that may be changed by a user setting, and for example, the number of depth layers may be 256 or another number.

Referring to FIG. 4B, the object 300 may be modeled as depth images 220 corresponding to a preset number of depth layers. Each of the depth images includes object data 321, 322, 323, and 324 of the object 300 at the corresponding depth. According to an example embodiment, the object data 321 to 324 may include information about an amplitude and a phase of light for representing the object 300 at a corresponding depth. Hereinafter, a depth image including object data may be referred to as a depth layer or object data. That is, the depth layer is a layer including object data.

The depth layer, i.e., object data, may be additionally generated by performing propagation, backpropagation, Fourier transform, IFF, etc. of object data at a particular depth.

Figure 5:
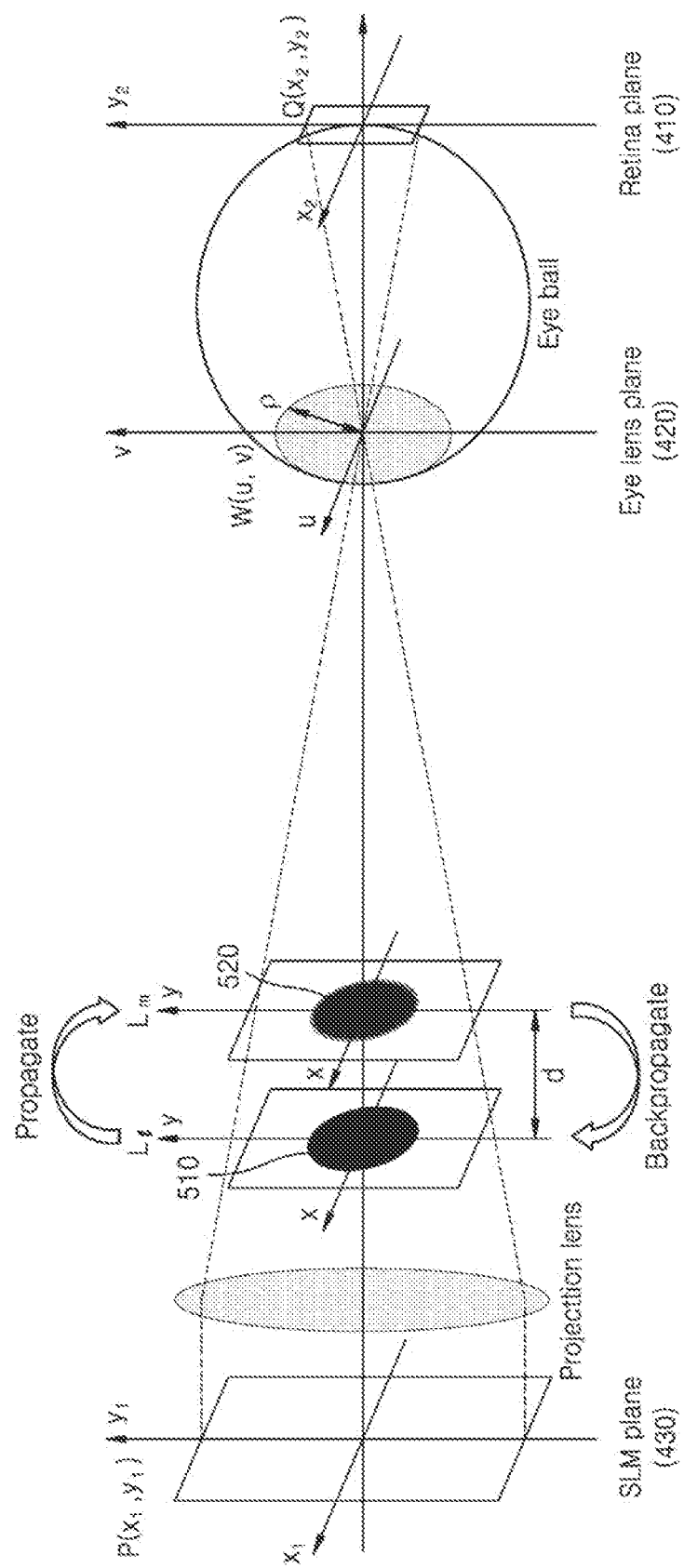
FIG. 5 is a diagram for describing a method of generating a depth layer according to an example embodiment.

FIG. 5 is a diagram for describing a method of generating a depth layer according to an example embodiment.

The depth layer, that is, object data, includes information about the amplitude and phase of light. The amplitude data of the object data includes information about the intensity of light. Based on the amplitude data of the object data in one depth layer, an image in the depth layer may be generated. The phase data of the object data includes information about the propagation of light. Based on the amplitude data and phase data of the object data in one depth layer, an image in another depth layer may be generated.

Amplitude data and phase data of object data in another layer may be obtained by propagating or back-propagating object data in one layer.

By propagating the first object data 510 from the first depth layer $L_l$ to the second depth layer $L_m$, amplitude data and phase data of the second object data 520 may be obtained. By backpropagating the second object data 520 from the second depth layer $L_m$ to the first depth layer $L_l$, amplitude data and phase data of the first object data 510 may be obtained.

Figure 6:
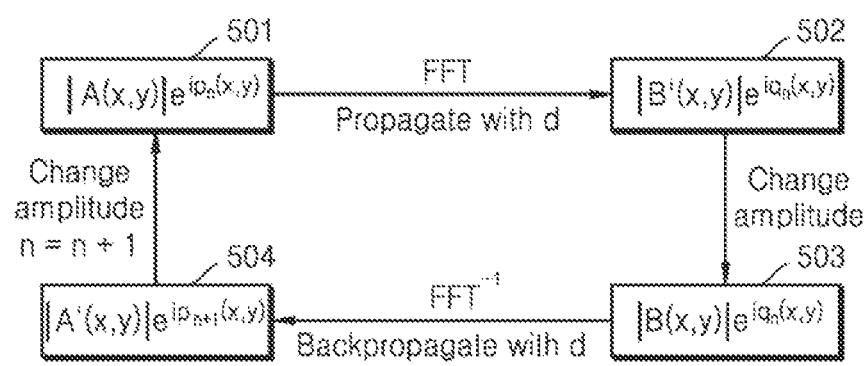
FIG. 6 is a diagram for describing a method of generating a depth layer according to another example embodiment.

FIG. 6 is a diagram for describing a method of generating a depth layer according to another example embodiment.

The CGH processor 110 sets the initial amplitude data of the first depth layer, that is, the first object data 501, to the preset first amplitude data |A(x,y)| The CGH processor 110 sets the initial phase data of the first object data 501 to randomized phase data $p_{n=1}(x, y)$.

The CGH processor 110 propagates the first object data 501 from the first depth layer to the second depth layer to acquire the amplitude data |B'(x,y)' and phase data q n=1 (x,y) of the second object data 502. The CGH processor 110 may perform a Fourier transform FFT on the first object data 501 based on the distance d that the first depth layer and the second depth layer are spaced apart and thus, propagate the first object data 501 from the first depth layer to the second depth layer.

The CGH processor 110 changes the amplitude data |B'(x,y)| of the second object data 502 to a preset second amplitude data |B(x,y)|.

The CGH processor 110 backpropagates the second object data 503 from the second depth layer to the first depth layer to acquire amplitude data |A'(x,y)| and phase data $p_{n=2}(x,y)$ of the first object data 504. The CGH processor 110 may perform an inverse Fourier transform (IFFT) on the second object data 503 based on the distance d at which the first depth layer and the second depth layer are spaced apart and thus, propagate the second object data 503 from the first depth layer to the second depth layer.

The CGH processor 110 changes the amplitude value |A'(x,y)| of the first object data 504 to a preset first amplitude data |A(x,y)|.

The CGH processor 110 increases n and repeats the loop shown in FIG. 6 to obtain the final first object data.

The CGH processor 110 may determine the phase data $p_{n=N+1}(x,y)$ of the final first object data obtained by repeating the loop shown in FIG. 6 a preset number of times N as the final phase data.

According to another example embodiment, the CGH processor 110 may determine the phase data $p_{n=M+1}(x,y)$ obtained by repeatedly performing the loop shown in FIG. 6 as the final phase data based on the comparison of the amplitude data |A'(x,y)| of the first object data 504 in the first depth layer with the preset first amplitude data |A(x,y)|. For example, the CGH processor 110 may repeat the loop shown in FIG. 6 M times until the difference between the amplitude data |A'(x,y)| of the first object data 504 and the first preset amplitude data |A(x,y)| becomes less than the preset threshold value.

According to another example embodiment, the CGH processor 110 may determine the phase data $p_{n=T+1}(x,y)$ of the first object data obtained by repeating the loop shown in FIG. 6 T times as the final phase data based on the comparison of the amplitude data |B'(x,y)| of the second object data 802 with the preset second amplitude data |B(x,y)|. For example, the CGH processor 110 may perform the loop shown in FIG. 6 by repeating the loop T times until the difference between the amplitude data |B'(x,y)| of the second object data 802 and the second preset amplitude data |B(x,y)| becomes less than the preset threshold value.

In an example embodiment, the LSR processor 120 may obtain the user's pose information by using the result received from the tracking sensor 15. For example, the tracking sensor 15 may be a camera, an inertial measurement unit (IMU) sensor, etc.

The LSR processor 120 may acquire the first pose information, for example, a pose change amount (or degrees of freedom (DoF) change amount) from the first view point to the second view point, based on the image information received from the tracking sensor 15. In this case, the first view point may refer to a view point at which image data is rendered by the CGH processor 110, and the second view point may refer to a view point at which the pixel shift for each pixel of the depth layer is calculated by the LSR processor 120.

In an example embodiment, the LSR processor 120 may calculate a pose change amount by applying a simultaneous localization and mapping algorithm (SLAM) to the image information received from the tracking sensor 15. In another example embodiment, the LSR processor 120 may calculate a pose change amount based on image information obtained through a camera module and data obtained through a sensor module (e.g., an IMU sensor).

In an example embodiment, the amount of change in the pose may be determined according to a plurality of parameter values. For example, the plurality of parameters for the pose change amount may include dtx, dty, dtz, dθx, dθy, and dθz. Among the plurality of parameters, dtx, dty, and dtz are displacement from the first view point to the second view point with respect to the position, and dθx, dθy, and dθz are displacement with respect to rotation from the first view point to the second view point.

Figure 7:
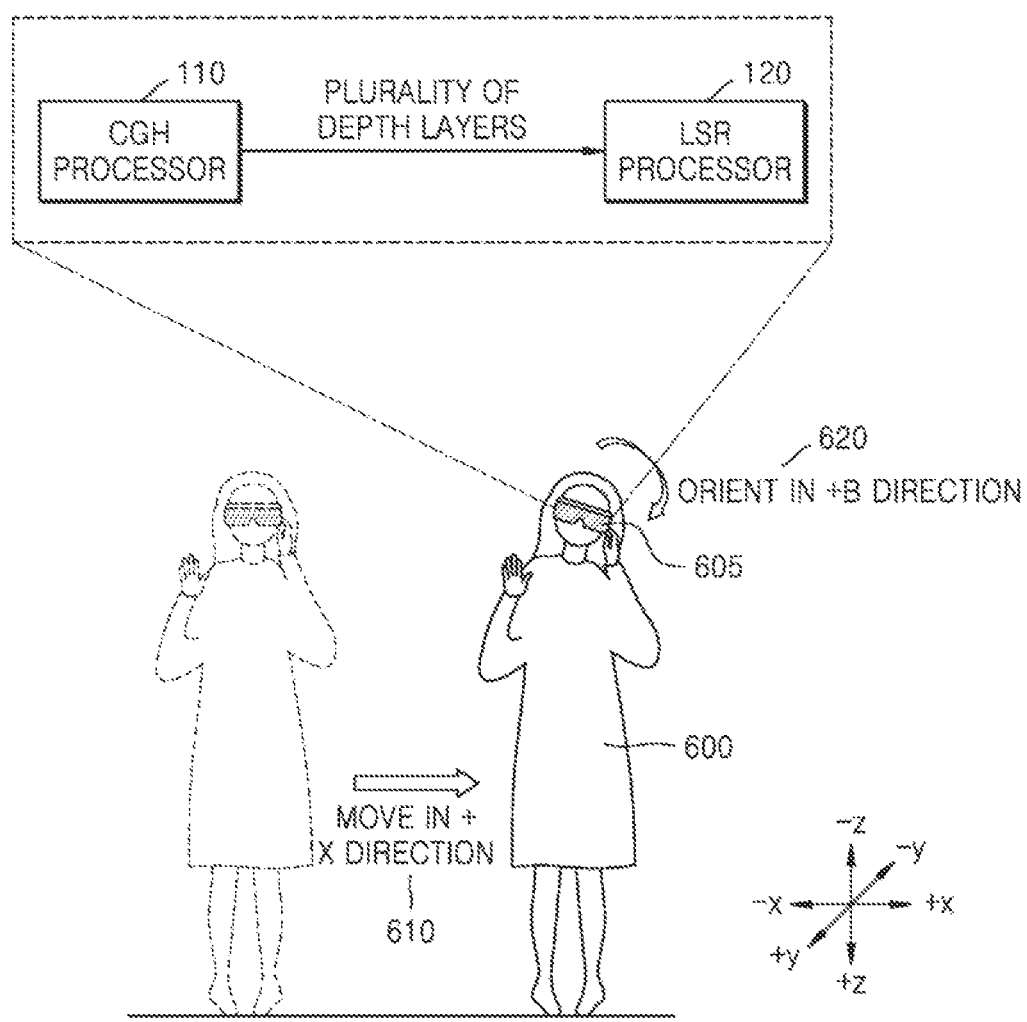
FIG. 7 is a diagram for describing data that an electronic device transmits and receives according to a user's movement, according to an example embodiment.

FIG. 7 is a diagram for describing data transmitted and received by the electronic device 10 according to a user's movement, according to an example embodiment.

Referring to FIG. 7, displacement with respect to position and orientation may occur in the AR glasses 1 by the user 600 wearing the AR glasses 1. For example, the user 600 may move 610 in the +x direction and orient 620 in the +β direction. The LSR processor 120 may receive a plurality of depth layers having different depth information from the CGH processor 110. The LSR processor 120 may reproject the plurality of depth layers by performing pixel shift on each of the plurality of depth layers based on the pose information.

The LSR processor 120 may calculate a pixel shift for each depth information. The pixel shift may refer to a shift degree of a coordinate value of a particular pixel included in the depth layer from the first view point to the second view point. In the memory 14, the pixel shift weight for each depth information may be pre-stored as a lookup table. For example, a depth layer having less depth information may have a greater pixel shift weight than a greater depth layer.

In an example embodiment, the LSR processor 120 may calculate a pixel shift for pixels included in the depth layer having the reference depth information based on the pose change amount. In addition, by applying the weight of the pixel shift for each depth information to the calculated pixel shift, the pixel shift for each depth information may be calculated. For example, the LSR processor 120 may calculate a pixel shift for each depth information by multiplying the calculated pixel shift corresponding to the reference depth information by a weight of the pixel shift for each depth information. The pixel shift may be calculated for each scan line of each depth layer, or may be calculated in units of blocks after dividing each depth layer into a plurality of blocks. Since pixel shifting for image data is a general technique, a detailed description thereof will be omitted.

The LSR processor 120 may generate a reprojected CGH by compensating each depth layer with a pixel shift corresponding to each depth layer ('reprojection'). For example, the reprojected CGH may refer to an overlap of the displaced image by reflecting the coordinate displacement (e.g., displacement by movement or orientation) of a plurality of pixels with respect to the depth layer generated by the CGH processor 110. For convenience of explanation below, CGH including a plurality of depth layers having different depth information generated by the CGH processor 110 may correspond to a plurality of different depth layers, and the reprojected CGH of the LSR processor 120 may be also referred to as CGH.

Figure 8:
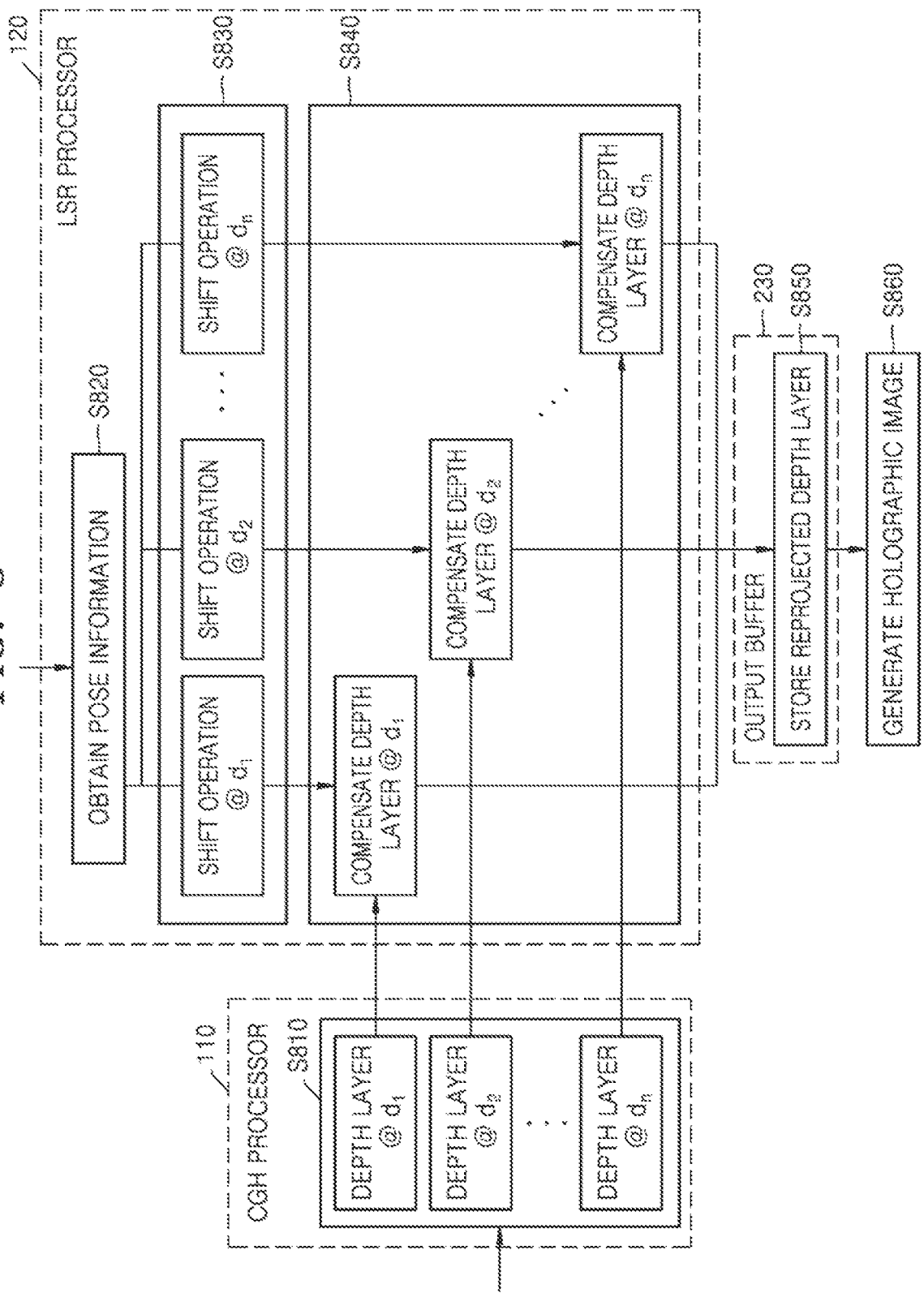
FIG. 8 is a reference diagram illustrating a method of simultaneously reprojecting a depth layer according to an example embodiment.

FIG. 8 is a reference diagram illustrating a method of simultaneously reprojecting a depth layer according to an example embodiment.

As shown in FIG. 8, the CGH processor 110 may generate a plurality of depth layers having different depth information from the rendered image data (S810). The plurality of depth layers may be generated by repeatedly performing propagation and backpropagation at least once, or by repeatedly performing at least one of Fourier transform and IFT.

The LSR processor 120 may acquire pose information from the result received from the tracking sensor 15 (S820). The pose information may be a pose change amount from the first viewpoint to the second view point.

The LSR processor 120 may calculate a pixel shift for each depth information (S830). A lookup table indicating a weight for pixel shift for each depth information may be pre-stored in the memory 14. For example, a depth layer having greater depth information may have a smaller pixel shift weight than a depth layer having low depth information.

For example, the LSR processor 120 may calculate a pixel shift for pixels included in the depth layer having the reference depth information based on the pose change amount. In addition, by applying the weight of the pixel shift for each depth information to the calculated pixel shift, the pixel shift for each depth information may be calculated. For example, a pixel shift of a depth layer having greater depth information may be greater than a pixel shift of a depth layer having low depth information.

The LSR processor 120 may reproject each depth layer by compensating the depth layer corresponding to each depth layer with a pixel shift (S840). The pixel shift may correspond to a degree to which a coordinate value of a particular pixel of image data is shifted from a first view point to a second view point.

The LSR processor 120 may compensate in the order from a depth layer having greater depth information to a depth layer having less depth information, the greater depth information being greater than the less depth information.

The LSR processor 120 may store the compensated depth layer in the output buffer 230 (S850). When the compensated depth layer is stored in the output buffer, the compensated depth layer with less depth information may be overwritten in the reprojected depth layer with greater depth information. For example, the LSR processor 120 may store the reprojected first depth layer having greater depth information in the output buffer 230, and store the reprojected second depth layer having less depth information in the output buffer 230. When storing the second depth layer, the LSR processor 120 may store a pixel value of a pixel overlapping a pixel included in the second depth layer among pixels included in the first depth layer as a pixel value of the second depth layer.

The spatial light modulator 12 may generate a holographic image by modulating light according to the CGH stored in the output buffer 230 (S850).

Figure 9:
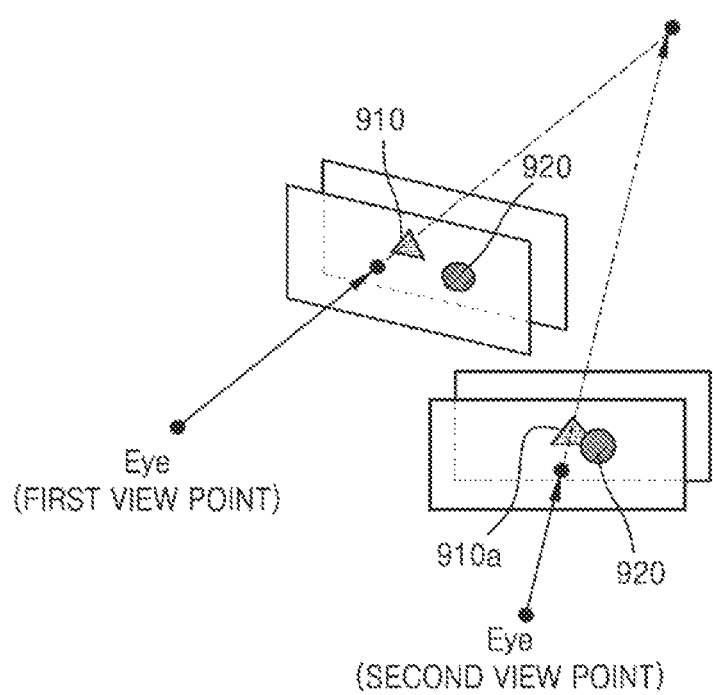
FIG. 9 is a reference diagram illustrating overwriting of a depth layer according to an example embodiment.

FIG. 9 is a reference diagram illustrating overwriting of a depth layer according to an example embodiment. The first depth layer and the second depth layer may display the first object 910 and the second object 920 at the first view point. The user may change the pose at the second view point. The LSR processor 120 may pixel-shift the first and second depth layers according to the amount of change in the pose. As a result of the pixel shift, a portion of the first object of the first depth layer may overlap the second object of the second depth layer. The LSR processor 120 may overwrite the pixel value of the overlapping first object 910a to the second object 920. For example, the LSR processor 120 may change the pixel value of the overlapping first object 910a to the pixel value of the second object 920. In addition, the spatial light modulator 12 may generate a holographic image corresponding to the first and second depth layers as shown in FIG. 9 by modulating light based on the overwritten depth layers.

Figure 10:
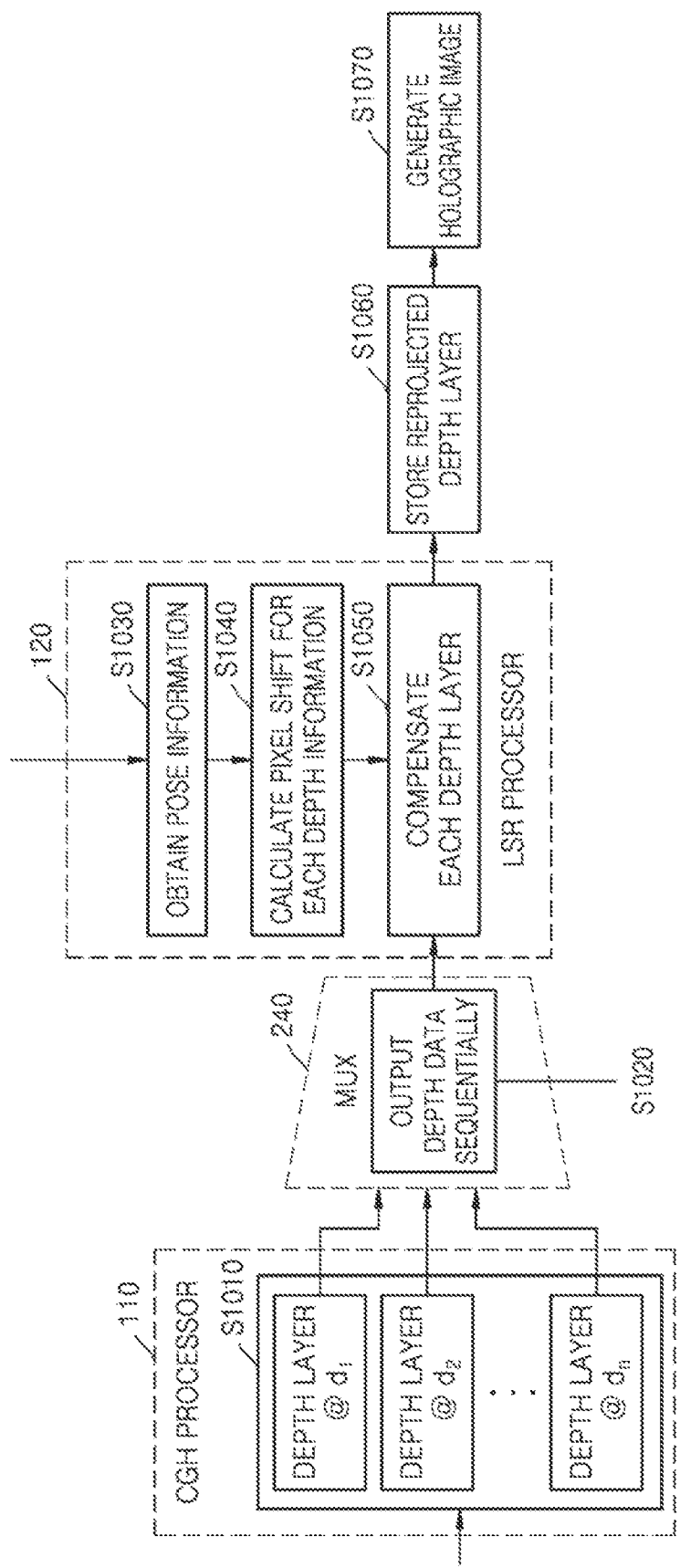
FIG. 10 is a reference diagram illustrating a method of sequentially reprojecting a depth layer according to an example embodiment.

FIG. 10 is a reference diagram illustrating a method of sequentially reprojecting a depth layer according to an example embodiment. The CGH processor 110 may generate a plurality of depth layers having different depth information from the rendered image data (S1010).

The processor 13 may further include a multiplexer 240 that outputs the depth layers to the LSR processor 120 one by one.

The multiplexer 240 may sequentially apply to the LSR processor from a depth layer having a greater depth information such that depth layers with greater depth information are compensated before depth layers with less depth information (S1020).

The LSR processor 120 may obtain pose information from the result received from the tracking sensor 15 (S1030), and may calculate a pixel shift for each depth information (S1040). The LSR processor 120 may compensate (or reproject) each depth layer with the calculated pixel shift (S1050), and store the compensated (or reprojected) CGH by overwriting the compensated depth layer having the less depth information in the compensated (or reprojected) depth layer having the greater depth information (S1060).

The spatial light modulator 12 may generate a holographic image by modulating light according to the stored CGH (S1070).

Figure 11:
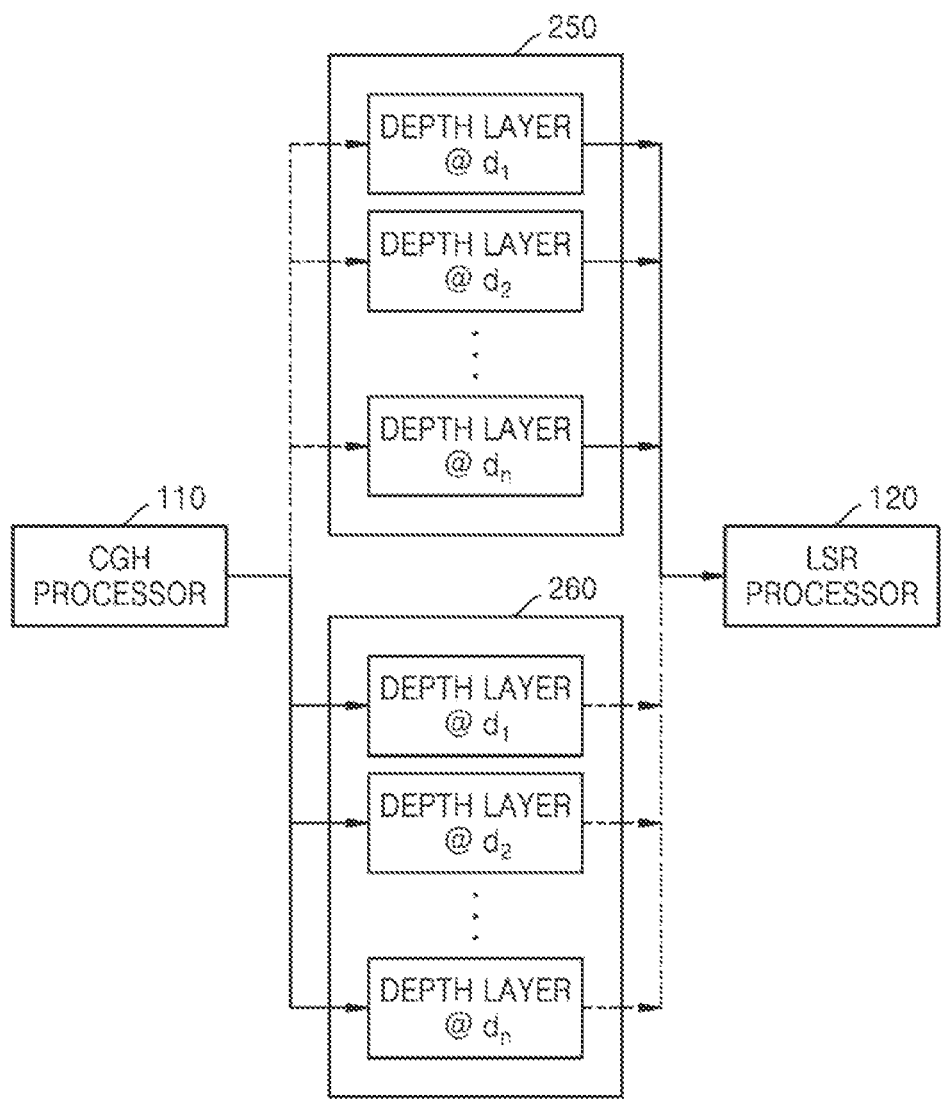
FIG. 11 is a reference diagram for explaining a method of processing CGH according to another example embodiment.

FIG. 11 is a reference diagram for explaining a method of processing CGH according to another example embodiment.

As shown in FIG. 11, the electronic device 10 may include a plurality of input buffers capable of storing CGH. For example, the electronic device 10 may further include a first input buffer 250 and a second input buffer 260.

The GGH processor 210 may generate a plurality of depth layers in units of frames by using image data. The CGH processor 110 may alternately store the generated plurality of depth layers in the first input buffer 250 and the second input buffer 260 in units of frames. For example, the CGH processor 110 may store, in the first input buffer 250, a first group including a plurality of depth layers having different depth information generated in the first view point. At the second view point, the LSR processor 120 may calculate a pixel shift for each depth layer by using the pose information input to the second view point.

Moreover, while the LSR processor 120 reprojects the depth layers included in the first group, the CGH processor 110 may generate a second group including a plurality of depth layers having different depth information using the rendered image data. While the LSR processor 120 reprojects the first group of the first view point, the CGH processor generates the second group of the second view point, such that latency and power consumption may be minimized.

The above-described electronic device and method generate a CGH including a plurality of depth layers having different depth information, and compensate for the holographic image according to the user's movement by reprojecting each of the plurality of depth layers.

In the above-described electronic device and method thereof, a holographic image corresponding to a user's movement may be automatically displayed by overwriting the reprojected depth layer with less depth information about the reprojected depth layer with greater depth information.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An electronic device for processing computer-generated holography (CGH), the electronic device comprising:
a first processor configured to generate a plurality of depth layers having different depth information from image data at a first view point; and
a second processor configured to generate CGH by reprojecting each of the plurality of depth layers based on pose information of a user at a second view point different from the first view point,
wherein, in the second processor, a pixel shift of a depth layer with first depth information is less than a pixel shift of a depth layer with second depth information, the first depth information being greater than the second depth information.

2. The electronic device of claim 1, further comprising a spatial light modulator configured to generate a holographic image based on the CGH.

3. The electronic device of claim 1, wherein the second processor is further configured to reproject each of the plurality of depth layers by pixel-shifting pixels included in each of the plurality of depth layers based on the pose information and depth information of each of the plurality of depth layers.

4. The electronic device of claim 1, wherein the second processor is further configured to simultaneously reproject each of the plurality of depth layers.

5. The electronic device of claim 1, wherein the second processor is further configured to perform reprojection in an order from the depth layer having the first depth information to the depth layer having the second depth information among the plurality of depth layers.

6. The electronic device of claim 1, further comprising an output buffer configured to store the plurality of reprojected depth layers,
wherein the second processor is further configured to overwrite a reprojected second depth layer having the second depth information to a reprojected first depth layer having the first depth information.

7. The electronic device of claim 6, wherein the second processor is further configured to store a pixel value of a first pixel among pixels included in the reprojected first depth layer, overlapping a second pixel included in the reprojected second depth layer as a pixel value of the reprojected second depth layer.

8. The electronic device of claim 1, wherein the pose information comprises a pose change amount from the first view point to the second view point.

9. The electronic device of claim 1, wherein the first processor is further configured to generate a plurality of depth layers having different depth information from new image data while the second processor reprojects each of the plurality of depth layers to the second view point.

10. The electronic device of claim 9, further comprising a first input buffer and a second input buffer configured to store depth layers,
wherein, while the second processor performs reprojection based on the depth layers stored in the first input buffer, the first processor is further configured to store the plurality of depth layers having different depth information generated from new image data in the second input buffer.

11. The electronic device of claim 1, wherein the electronic device is included in at least one of a head mounted display (HMD), a glasses-type display, and a goggle-type display.

12. A method of operating an electronic device for processing computer-generated holography (CGH), the method comprising:
  generating a plurality of depth layers having different depth information from the image data at a first view point; and
  reprojecting each of the plurality of depth layers based on pose information of a user at a second view point different from the first view point to generate CGH,
  wherein the reprojecting of the each of the plurality of depth layers comprises performing reprojection in an order from a depth layer having first depth information to a depth layer having second depth information among the plurality of depth layers, the first depth information being greater than the second depth information.

13. The method of claim 12, further comprising generating a holographic image based on the CGH.

14. The method of claim 12, wherein the reprojecting of the each of the plurality of depth layers comprises pixel-shifting pixels included in each of the plurality of depth layers based on the pose information and depth information of each of the plurality of depth layers.

15. The method of claim 14, wherein in the pixel-shifting of the pixels, a pixel shift of the depth layer with the first depth information is less than a pixel shift of the depth layer with the second depth information.

16. The method of claim 12, further comprising storing the plurality of reprojected depth layers,
  wherein the storing of the plurality of reprojected depth layers comprises overwriting a reprojected second depth layer having second depth information to a reprojected first depth layer having first depth information.

17. The method of claim 16, wherein, the overwriting of the reprojected second depth layer comprises storing a pixel value of a first pixel, among pixels included in the reprojected first depth layer, overlapping a second pixel included in the reprojected second depth layer as a pixel value of the reprojected second depth layer.

18. The method of claim 12, wherein the pose information comprises a pose change amount from the first view point to the second view point.

\* \* \* \* \*